United States Patent [19]

Sakata

[11] Patent Number: 5,131,060

[45] Date of Patent: Jul. 14, 1992

[54] OPTICAL WAVEGUIDE MODULATOR COMMUNICATIONS DEVICE AND METHOD OF MODULATING LIGHT USING SAME

[75] Inventor: Hajime Sakata, Hiratsuka, Japan
[73] Assignee: Canon Kabushiki Kaisha, Tokyo, Japan
[21] Appl. No.: 727,072
[22] Filed: Jul. 9, 1991

[30] Foreign Application Priority Data

Jul. 9, 1990 [JP] Japan .................................. 2-181351

[51] Int. Cl.$^5$ ........................ G02B 6/10; G02F 1/00; H01L 27/14
[52] U.S. Cl. ........................................... 385/2; 385/9; 385/10; 385/28; 385/37; 385/40; 359/130; 359/154; 359/164; 359/173; 359/245; 359/320; 359/576; 357/16; 357/30
[58] Field of Search .................... 385/2, 9, 10, 14, 40, 385/28, 37; 359/127, 130, 154, 164, 179, 185, 196, 245, 305, 320, 569, 576; 357/4, 16, 17, 19, 30

[56] References Cited

U.S. PATENT DOCUMENTS

| | | | |
|---|---|---|---|
| 3,920,314 | 11/1975 | Yajima | 385/9 |
| 4,008,947 | 2/1977 | Baües et al. | 385/9 |
| 4,390,236 | 6/1983 | Alferness | 385/9 |
| 4,521,069 | 6/1985 | Ikeda | 385/9 |
| 4,690,489 | 9/1987 | Neyer | 385/28 |
| 4,760,569 | 7/1988 | Mahlein | 359/130 |
| 4,787,691 | 11/1988 | Lorenzo et al. | 385/9 |
| 4,861,130 | 8/1989 | Katsuyama et al. | 385/2 |
| 4,874,216 | 10/1989 | Utaka et al. | 385/2 |
| 4,904,045 | 2/1990 | Alferness et al. | 385/37 |
| 4,923,264 | 5/1990 | Langer et al. | 385/2 |
| 4,997,246 | 3/1991 | May et al. | 385/2 |
| 5,005,933 | 4/1991 | Shimuzu | 385/2 |
| 5,067,788 | 11/1991 | Jannson et al. | 385/2 |

OTHER PUBLICATIONS

H. Inoue and H. Matsumura, "Semiconductor Waveguides and Optical Switches," Institute of Electronics, Information and Communication Engineers of Japan, OQE86-39, pp. 75-81 (1986).
T. Miki, M. Haruna and J. Koyama, "Tunable Optical Directional Coupler Filter With an Electro-Optic Grating, " Institute of Electronics, Informationa and Communication Engineers of Japan, OQE81-129, pp. 39-46 (1981).
T. Numai, S. Murata, M. Nishio and I. Mito, "Semiconductor Tunable Wavelength Filters", Institute of Electronics, Information and Communication Engineers of Japan, OQE88-65, pp. 9-16 (1988).
Y. Kanayama, N. Goto and Y. Miyazaki, "Optical Signal Processing Using Acousto-Optic Switch, " Institute of Electronics, Information and Communication Engineers of Japan, US88-42, pp. 1-6 (1988).
W. Warzanskyj, F. Heismann and R. C. Alferness, "Polarization-Independent Electro-Optically Tunable Narrow-Band Waveguide Filter, " Applied Physics Letters, vol. 53(1), pp. 13-15 (1988).
J. S. Weiner, D. A. B. Miller, D. S. Chemla, T. C. Damen, C. A. Burrus and T. H. Wood, A. C. Gossard and W. Weigmann, "Strong Polarization-Sensitive Electroabsorption in GaAs/AlGaAs Quantum Well Waveguides," Applied Physics Letters, vol. 47(11), pp. 1148-1150 (1985).
R. C. Alferness, T. L. Koch, L. L. Buhl, F. Storz, F. Heismann and J. R. Martyak, "Grating Assisted InGaAsl/InP Vertical Co-directional Coupler Filter," Integrated and Guided-Wave Optics, 1989 Technical Digest Series vol. 4, pp. 214-218 (Feb. 1989) and vol. 55(19), pp. 2011-2013 (Nov. 1989).

*Primary Examiner*—Brian Healy
*Attorney, Agent, or Firm*—Fitzpatrick, Cella, Harper & Scinto

[57] ABSTRACT

An optical modulator includes a substrate, a first waveguide layer formed on the substrate, a second waveguide layer stacked together with the first waveguide layer in a direction of a thickness thereof on the substrate, the second waveguide layer having a waveguide mode different from that of the first waveguide layer, a diffraction grating formed in a region where the waveguide modes of the first and second waveguide layers overlap each other, and an electrode. When the electrical signal is applied through the electrode, the wavelength of the light coupled by the diffraction grating is changed, and light output from the second waveguide layer is modulated in accordance with the electrical signal. A method of modulating light using the above optical modulator is also disclosed.

20 Claims, 10 Drawing Sheets

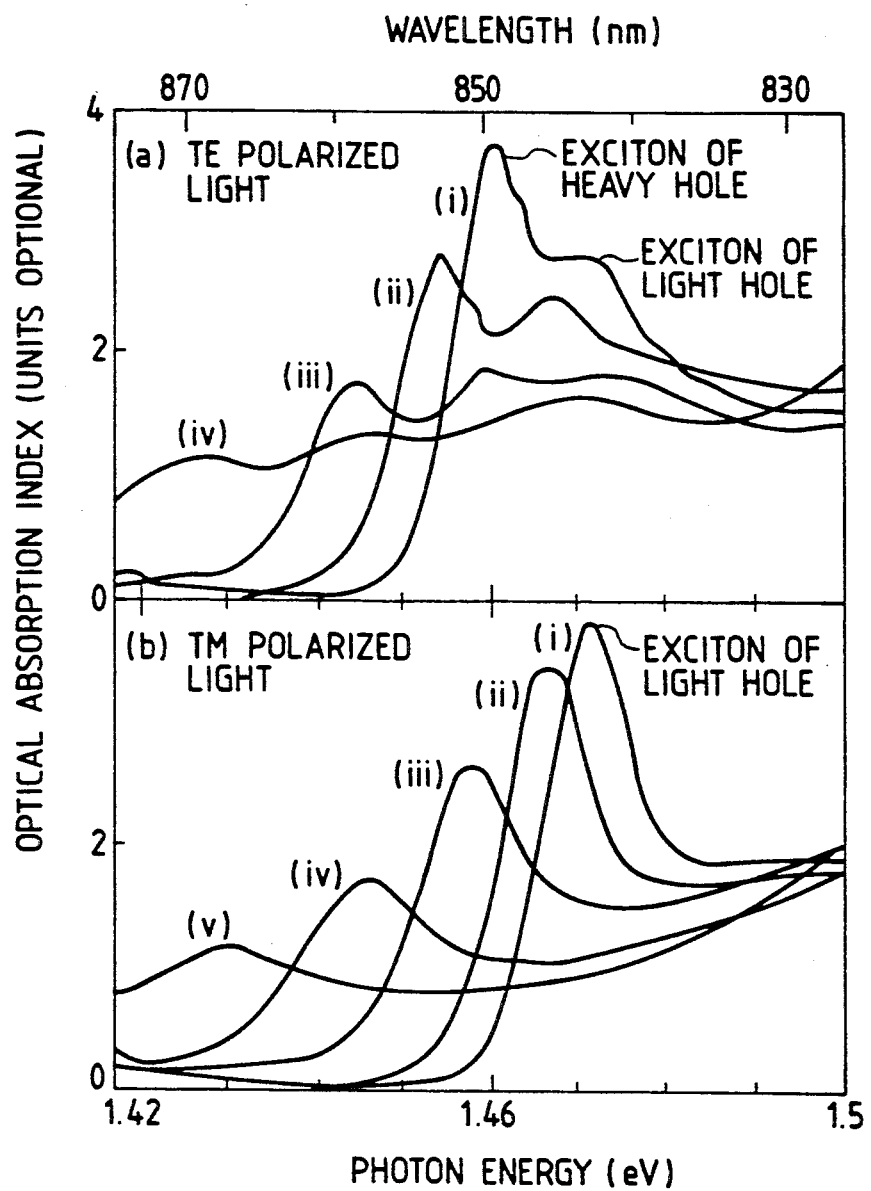

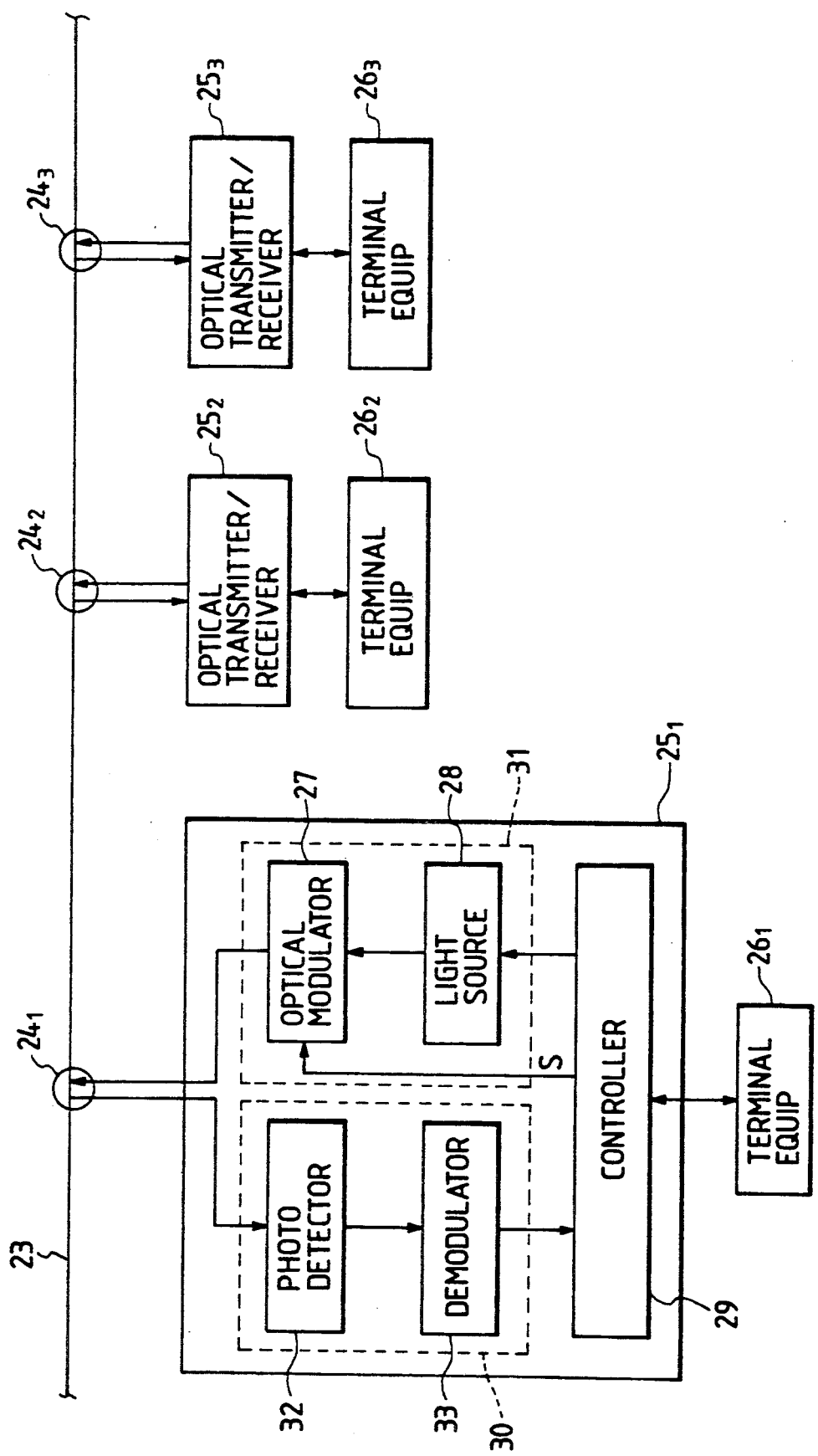

OPTICAL WAVEGUIDE MODULATOR COMMUNICATIONS DEVICE AND METHOD OF MODULATING LIGHT USING SAME

BACKGROUND OF THE INVENTION

1. Field of the Invention

The present invention relates to an optical modulator used in an optical communication system, an optical exchange apparatus, an optical information processing apparatus, or an optical recording apparatus, and a method of modulating light using the same.

2. Related Background Art

A conventional high-speed optical modulator utilizing a semiconductor element which can be driven with a low drive voltage and can be easily integrated with other optical electronic elements such as a semiconductor laser is known.

For example, an absorption type optical modulator utilizing an absorption end shift of a semiconductor (e.g., a semiconductor layer of a bulk or quantum well structure) upon application of an electric field is proposed in Applied Physics Letters, Vol. 47, pp. 1148-1150 (1985). A directional coupler type optical modulator utilizing a change in refractive index upon application of an electric field is proposed in Report OQE 86-39, the Institute of Electronic and Communication Engineers of Japan, (1986) is also proposed.

The former optical modulator comprises a semiconductor waveguide having a p-i-n structure. Upon application of an electric field, an absorption end is shifted by the Franz-Keldysh effect or QCSE (Quantum Containment Stark Effect), as shown in FIG. 3, to change the absorption index, and a transmittance of light having a given wavelength can be controlled In the optical modulator of this type, a wavelength used must be set closer to the absorption end so as to increase an extinction ratio. For this reason, a transmittance in a transmission state is decreased, and hence an insertion loss is increased. Light components having all wavelengths cannot always be modulated depending on the wavelength of the absorption end. That is, a wavelength to be modulated, i.e., the wavelength used, is limited to a predetermined range, resulting in inconvenience.

FIG. 1A is a schematic plan view showing an arrangement of a first conventional directional coupler type optical modulator, and FIG. 1B is a sectional view of the optical modulator along the line A—A' in FIG. 1A. This optical modulator comprises ridges 100, aluminum electrodes 101, waveguides 102, aluminum electrodes 103, an n$^-$-GaAs layer (optical waveguide layer) 104, an n$^+$-GaAs layer 105, an aluminum electrode 106, and a GaAlAs layer 107.

In the above optical modulator, the electrodes are formed in coupling regions of the two waveguides, and an electric field is applied to these electrodes to cause a change in refractive index, thereby shifting a light wave between the waveguides.

FIG. 2A is a schematic plan view showing an arrangement of a second conventional directional coupler type optical modulator, and FIG. 2B is a sectional view of the optical modulator along the line A—A' in FIG. 2A. This optical modulator comprises optical waveguides 200, a p$^-$-side electrode 201, an SiO$_2$ layer 202, an InGaAsP gap 203, an InP cladding layer 204, an InGaAsP optical waveguide layer 205, an InP substrate 206, an n$^-$-side electrode 207, diffusion regions 208, and a graded region (refractive index changing region) 209.

In the above optical modulator, the electrodes are formed in crossing regions of the two waveguides, and an electric field is applied to these electrodes to cause a change in refractive index, thereby shifting a light wave between the waveguides.

In the optical modulator shown in FIGS. 2A and 2B, light from an exit end of one of the waveguides is modulated. In the optical modulator of this type, however, although the degree of optical modulation is controlled by a change in refractive index, an absorption index is necessarily changed with the change in refractive index. Therefore, optical modulation cannot be stably performed, resulting in inconvenience. When the element length, i.e., the waveguide length, is shortened, and the optical modulator is designed to obtain a large change in refractive index with respect to a constant electric field so as to reduce a drive voltage, the range of wavelength to be modulated comes close to the range of wavelength corresponding to a large absorption index, resulting in inconvenience.

In a conventional wavelength division multiplexing system, a demultiplexer is used as a unit for dividing a given wavelength range into channels. Demultiplexing is performed by using a wavelength dispersion unit, e.g., an interference filter or grating to split light into transmitting and reflected components depending on wavelengths, or by utilizing different reflection angles. This demultiplexer has an advantage in that data of several wavelengths can be simultaneously received, but has a disadvantage in that the element area is increased because the data multiplexed in the wavelength region is split into a spatial region. In addition, in relation with the above drawback, the number of photodetectors to be integrated is limited. As a result, it is difficult to obtain a high-density wavelength multiplexing arrangement.

In order to solve the above problem, a variable wavelength filter is available to provide one photodetector which can sufficiently cope with a wavelength multiplexing scheme. In addition, when the number of channels of the variable wavelength filter is increased, the degree of wavelength multiplexing can be increased. This variable wavelength filter is exemplified as a filter utilizing a TE-TM mode converter, as proposed in Applied Physics Letters, Vol. 53, pp. 13-15 (1988). In Report OQE81-129, the Institute of Electronics, Information and Communication Engineers of Japan, (1981), a variable wavelength filter utilizing an even-odd mode converter is proposed. In addition, in Report US88-42, the Institute of Electronics, Information and Communication Engineers of Japan, (1988), a variable wavelength filter utilizing a surface acoustic wave (SAW) is proposed.

Although these variable wavelength filters have a wide variable wavelength range of 100 Å or more, they are devices utilizing LiNbO$_3$, thus posing a problem as to a coupling loss with a photodetector. In addition, since a refractive index is obtained by an electrooptical effect (i.e., a Pockels effect), a high voltage of several tens of V to 200 V is required. Furthermore, as variable wavelength filters using compound semiconductors such as GaAs and InP, filters utilizing a DFB (Distributed FeedBack) laser and a DBR (DistriButed Reflection) type laser at a value smaller than an oscillation threshold value are also known. In Report OQE88-65, the Institute of Electronics, Information and Communication Engineers of Japan (1988), a variable wavelength filter utilizing a Fabry-Pérot laser at an oscillation threshold value or less is proposed.

These conventional variable wavelength filters can be easily integrated with photodetectors and have gains upon injection of currents. Since the variable wavelength range is directly determined by the width of a change in refractive index, a practical variable wavelength filter described above can obtain only a variable wavelength range of several Å to several tens of Å.

SUMMARY OF THE INVENTION

It is an object of the present invention to provide an optical modulator which has a large degree of freedom of selection of a wavelength in design and can be stably operated, and a method of modulating light by using the optical modulator.

In order to achieve the above object of the present invention, there is provided an optical modulator comprising:

a substrate;

a first waveguide layer formed on the substrate, the first waveguide layer being arranged to guide external input light and output modulated light;

a second waveguide layer stacked together with the first waveguide layer in a direction of a thickness thereof on the substrate, the second waveguide layer having a waveguide mode different from that of the first waveguide layer;

a diffraction grating formed in a region where the waveguide modes of the first and second waveguide layers overlap each other, the diffraction grating coupling to the second waveguide layer light having a wavelength range selected from those of light components propagating through the first waveguide layer; and an electrode for applying a modulated electrical signal, wherein when the electrical signal is applied through the electrode, the wavelength of the light coupled by the diffraction grating is changed, and light output from the second waveguide layer is modulated in accordance with the electrical signal.

There is also provided a method of modulating light by using the above optical modulator, comprising the steps of:

inputting light into a first waveguide layer;

causing the input light to propagate through the first waveguide layer;

causing a diffraction grating to couple to the second waveguide layer light having a wavelength range selected from those of light components propagating through the first waveguide layer;

applying a modulated electrical signal through an electrode to change the wavelength of the light coupled by the diffraction grating, so that the light propagating through the first waveguide layer is modulated by the change in wavelength; and outputting the modulated light from the second waveguide layer.

According to an aspect of the present invention, there is provided an optical modulator comprising:

a substrate;

a first cladding layer consisting essentially of a semiconductor of a first conductivity type formed on the substrate;

a first waveguide layer consisting essentially of a semiconductor of the first conductivity type formed on the first cladding layer, the first waveguide layer being arranged to guide external input light and output modulated light;

a second cladding layer consisting essentially of a semiconductor of the first conductivity type formed on the first waveguide layer;

a second waveguide layer consisting essentially of an intrinsic semiconductor of a quantum well structure formed on the second cladding layer, the second waveguide layer having a waveguide mode different from that of the first waveguide layer;

a third cladding layer consisting essentially of a semiconductor of a second conductivity type formed on the second waveguide layer;

a diffraction grating formed in a region where the waveguide modes of the first and second waveguide layers overlap each other, the diffraction grating coupling to the second waveguide layer light having a waveguide range selected from those of light components propagating through the first waveguide layer; and an electrode for applying a reverse-biasing modulated electrode field to the first and second waveguide layers and the first, second, and third cladding layers, wherein when the electric field is applied through the electrode, the wavelength of the light coupled by the diffraction grating is changed to modulate the light output from the second waveguide layer.

According to another aspect of the present invention, there is provided a method of modulating light by using the above optical modulator, comprising the steps of:

inputting light into a first waveguide layer;

causing the input light to propagate through the first waveguide layer;

causing a diffraction grating to couple to the second waveguide layer light having a wavelength range selected from those of light components propagating through the first waveguide layer;

applying a reverse-biasing modulated electrical signal to the first and second waveguide layers and the first, second, and third cladding layers through an electrode to change the wavelength of the light coupled by the diffraction grating, so that the light propagating through the first waveguide layer is modulated by the change in wavelength; and outputting the modulated light from the second waveguide layer.

BRIEF DESCRIPTION OF THE DRAWINGS

FIG. 3 is a graph showing an absorption spectrum of a conventional optical modulator using a QCSE;

FIG. 12 is a block diagram showing an arrangement of an optical communication system using an optical modulator of the present invention.

DETAILED DESCRIPTION OF THE PREFERRED EMBODIMENTS

Figure 1A:
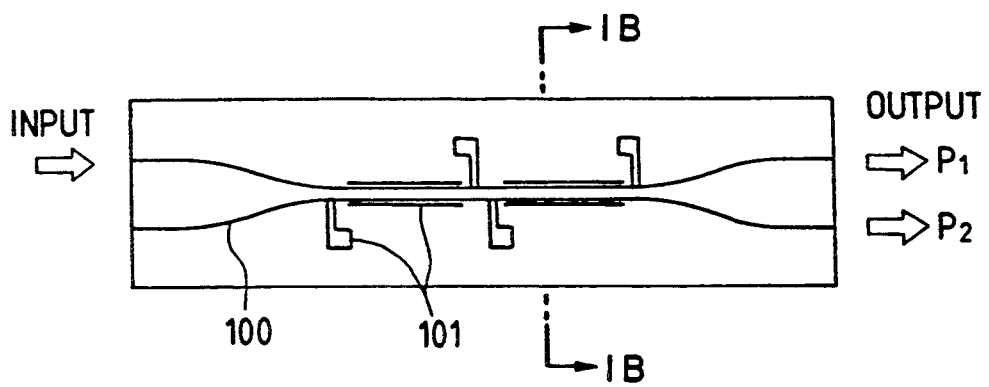
FIGS. 1A and 1B are a schematic plan view and a schematic sectional view, respectively, showing an arrangement of a first conventional directional coupler type optical modulator.
Figure 1B:
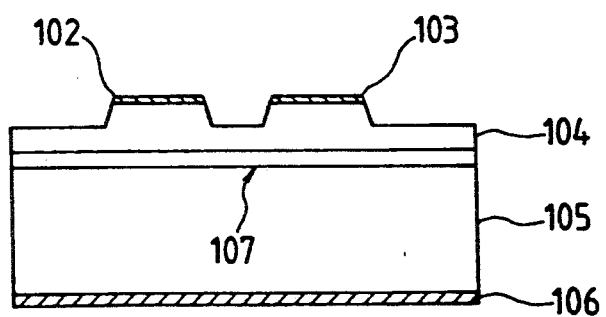
Figure 2A:
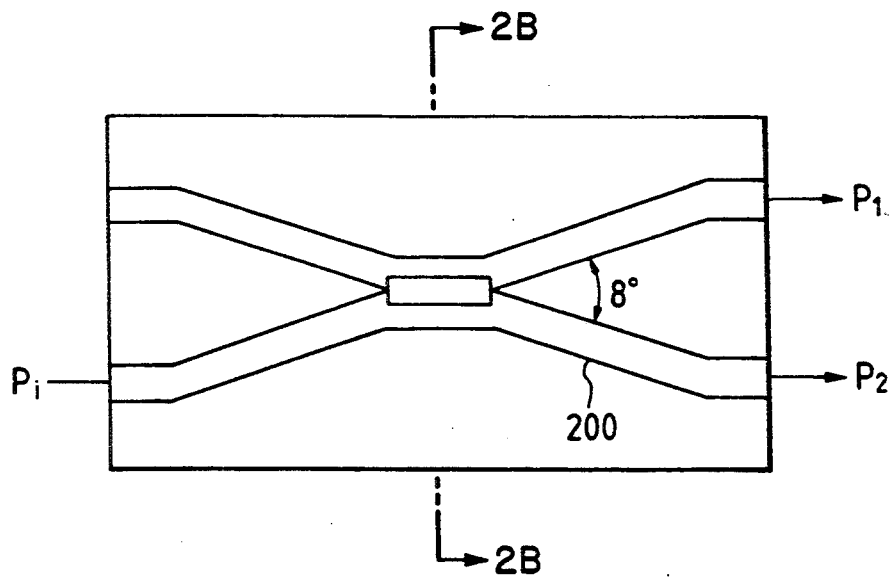
FIGS. 2A and 2B are a schematic plan view and a schematic sectional view, respectively, showing an arrangement of a first conventional directional coupler type optical modulator.
Figure 2B:
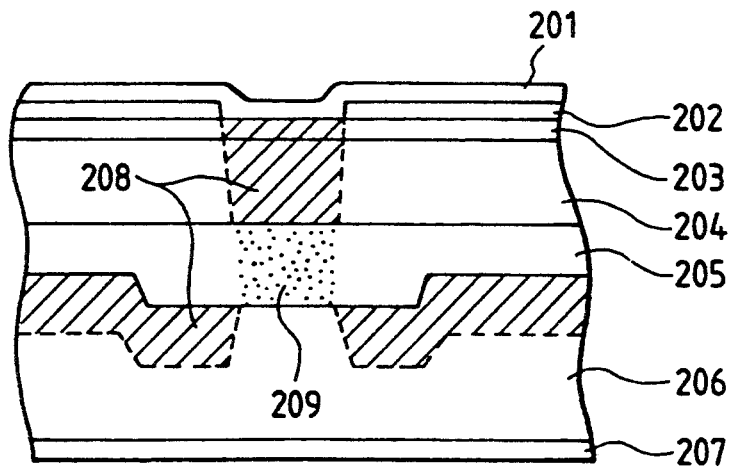
Figure 4A:
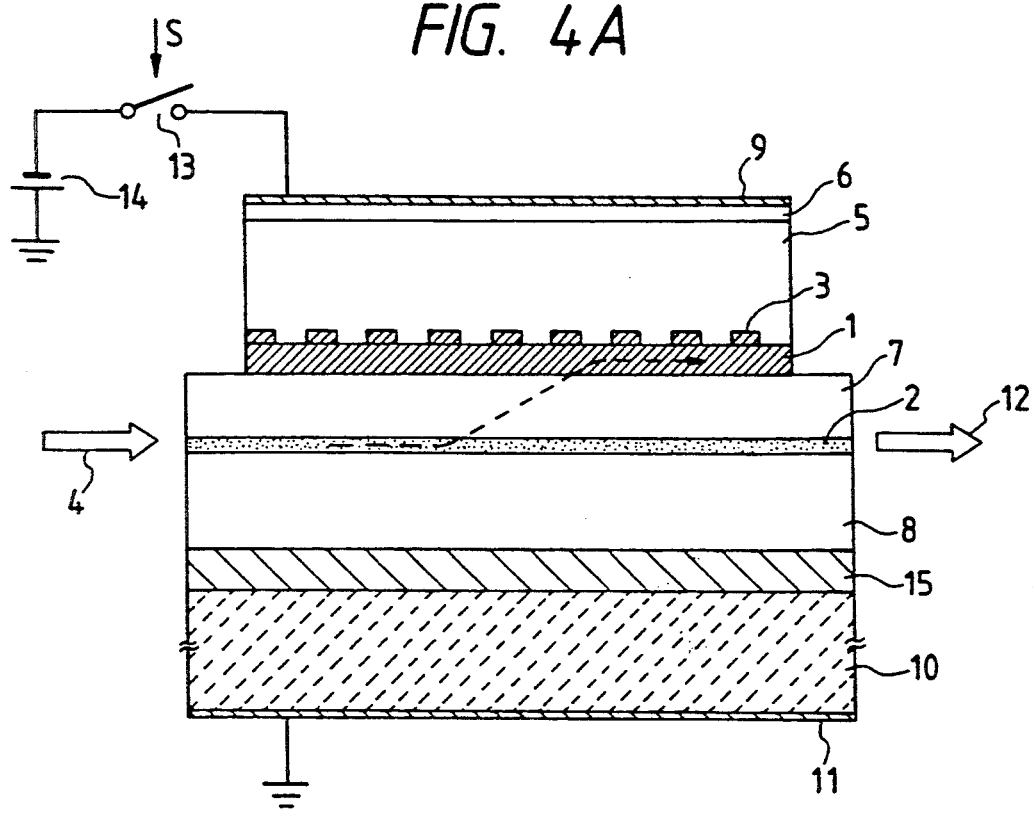
FIGS. 4A and 4B are a side sectional view and a front sectional view, respectively, showing an optical modulator according to the first embodiment of the present invention.
Figure 4B:
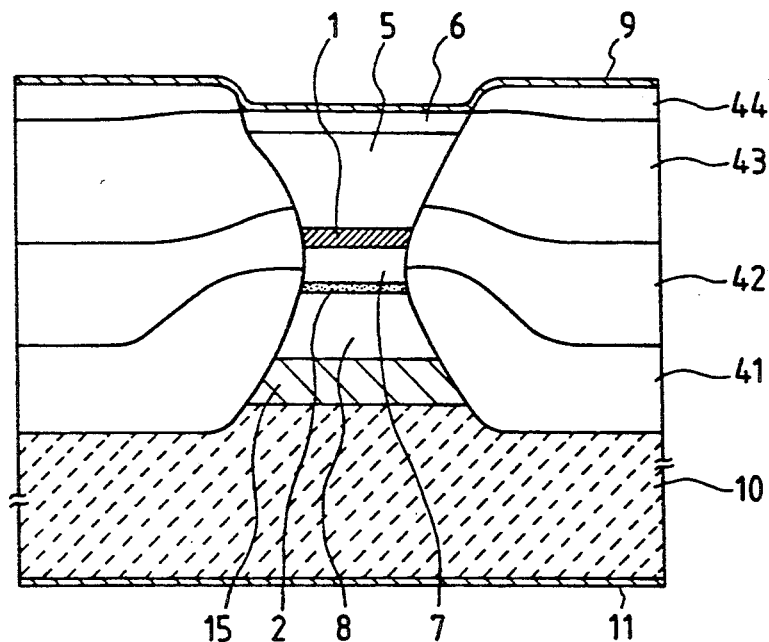

FIGS. 4A and 4B are a side sectional view and a front sectional view of an optical modulator according to the first embodiment of the present invention.

The principle and arrangement of the optical modulator will be described below. This embodiment has a stacking directional coupler. Two waveguides 1 and 2 constituting this directional coupler have different refractive indices and different thicknesses to constitute a so-called asymmetrical directional coupler. This directional coupler transmits 0th- and 1st-order modes. The 0th-order mode mainly propagates through the upper waveguide 1, and the first-order mode mainly propagates through the lower waveguide 2.

If a propagation constant of the 0th-order mode is given as $\beta_0$ and a propagation constant of the 1st-order mode is given as $\beta_1$, the propagation constants $\beta_0$ and $\beta_1$ have a large difference due to asymmetry between the upper and lower waveguides 1 and 2. For this reason, a grating 3 is formed in the upper waveguide 1 in this directional coupler to compensate for the propagation constant difference.

The 0th- and 1st-order modes are coupled at an incident light wavelength $\lambda$ satisfying the following condition:

$$\beta_0(\lambda) - \beta_1(\lambda) = 2\pi/\Lambda \qquad (1)$$

where $\Lambda$ is the period of the grating 3.

With the above arrangement, light 4 incident on the lower waveguide 2 becomes the 1st-order mode and is coupled to the 0th-order mode at the specific wavelength $\lambda$ to cause transition to the upper waveguide 1. At any wavelength except for the above specific wavelength, the 1st-order mode is not coupled to the 0th-order mode and propagates along the lower waveguide 2.

In the optical modulator of the first embodiment, the above directional coupler consists of GaAs/AlGaAs. The upper waveguide 1 is set in a carrier nondoped state, i.e., comprises an i-type (intrinsic) layer. A cladding layer 5 and a contact layer 6 of the upper waveguide 1 are p-type layers. A cladding layer 7 between the upper and lower waveguides 1 and 2, the lower waveguide layer path layer 2, and a lower cladding layer 8 of the lower waveguide 2 comprise n-type layers, respectively. The upper waveguide (i-type layer) is sandwiched to constitute a p-i-n structure.

A reverse-biasing electric field is applied from a voltage source 14 to the optical modulator through electrodes 9 and 11. The applied electrode field is modulated upon ON/OFF operation of a switch 13 in response to a modulation signal S.

When a reverse electric field is applied across the upper electrode 9 of the p-type contact layer 6 and the electrode 11 on the lower surface of an N+ substrate 11, i.e., when a positive voltage is applied to the n-type electrode 10, an electric field is concentrated on the upper waveguide 1 constituted by the i-type layer. If the upper waveguide has a structure including an MQW (Multiple Quantum Well), QCSE occurs due to this reverse electric field to change an absorption index of the upper waveguide 1. The refractive index is changed accordingly as indicated by the Kramers-Kronig relation.

The propagation constant $\beta_0$ of the 0th-order mode mainly propagating through the upper waveguide 1 is changed to change the value of the wavelength $\lambda$ satisfying condition (1). The width of change in wavelength is not directly determined by the width of change of refractive index.

Figure 5:
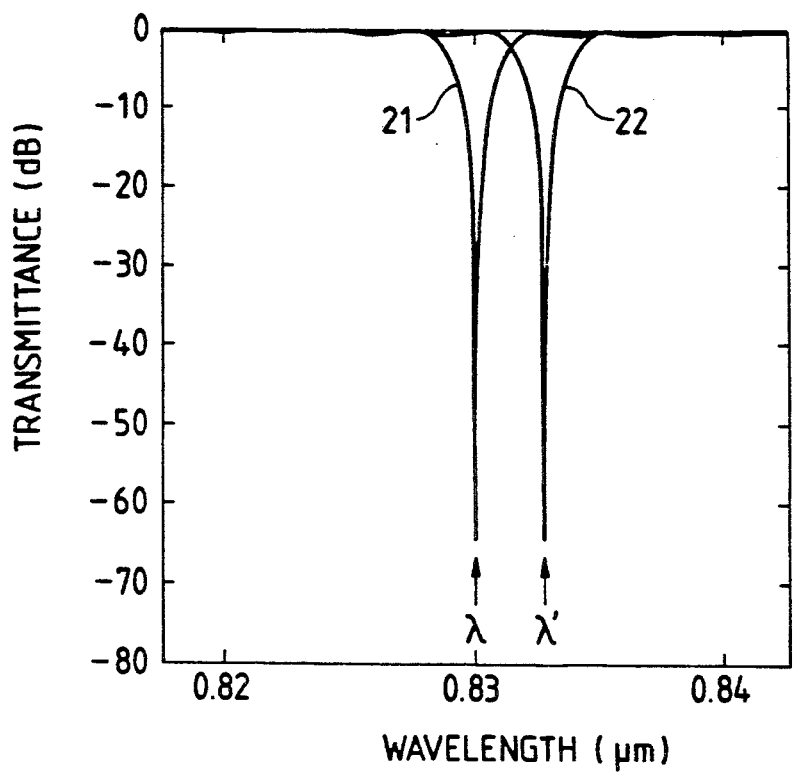
FIG. 5 is a graph showing a transmission spectrum of the optical modulator shown in FIG. 4.

FIG. 5 represents a transmission spectrum of the lower waveguide 2 in FIG. 4A, i.e., an intensity ratio of incident light to emerging light 12. In a static state, i.e., a state wherein no electric field is applied, the transmittance is abruptly decreased at the specific wavelength $\lambda$ as indicated by reference numeral 21 in FIG. 5, i.e., at a wavelength for shifting the light to the upper waveguide 1. In other words, a transmission blocking range is formed centered on the wavelength $\lambda$.

In a state wherein an electric field is applied, a wavelength for shifting the light to the upper waveguide 1, i.e., for satisfying condition (1) is changed to $\lambda'$. Therefore, the transmission blocking range is shifted as indicated by reference numeral 22 in FIG. 5.

As described above, by controlling the transmission blocking range in accordance with the electric field, the amount of the light 12, i.e., the transmittance of incident light 4 having the wavelength $\lambda$ upon propagation through the lower waveguide 2 can be controlled, thereby forming an optical modulator.

Figure 6:
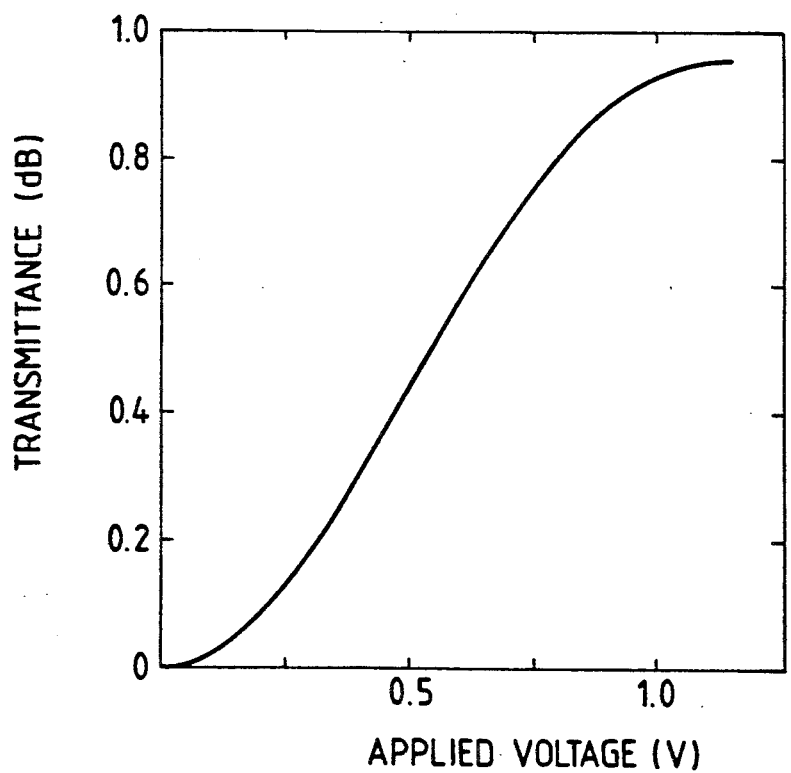
FIG. 6 is a graph showing a transmission spectrum as a function of applied voltage in the optical modulator shown in FIG. 4.

In this embodiment, since the directional coupler having enhanced wavelength selectivity by adding the grating 3 is used, a large change in transmittance occurs by slight transition of the transmission blocking range. That is, as shown in FIG. 6, input light having the specific wavelength $\lambda$ can be ON/OF-controlled by a small voltage difference of about 1 V.

In this embodiment, the lower waveguide serving as a waveguide for light to be modulated (i.e., light to be used) does not require a change in refractive index upon application of an electric field. Therefore, an absorption end can be sufficiently separated from the wavelength of the light to be modulated, and an insertion loss caused by absorption of the light to be modulated is very small. The insertion loss is generally 1 dB or less. In addition, in the p-i-n structure, since no electric field is applied to the lower waveguide 2 upon application of the electric field, no changes in absorption index and refractive index occur. Also judging from this point, the absorption end of the lower waveguide 2 can be sufficiently separated from the wavelength of the light to be modulated.

In the optical modulator of the present invention, the layer whose refractive index and absorption index are changed upon application of an electric field is separated from the layer for guiding and outputting the light to be modulated (light to be used). For this reason, the light to be modulated (light to be used) is not susceptible to influences of changes in absorption index with a change in refractive index. Optical modulation can thus be performed by refractive index control. The 1st-order mode light propagating through the lower waveguide 2 is slightly influenced by a change in absorption index because a tailing portion of the light intensity distribution is present in the upper waveguide 1. This change in absorption index, however, is very small with respect to the total change, thus posing no serious problem.

In this embodiment, since the change in refractive index upon application of an electric field in the upper waveguide 1 is set large, the absorption end of the upper waveguide 1 is set at a position closer to the wavelength of the light to be modulated. As a result, the absolute value of the absorption index becomes large, and then the change in absorption index becomes large accordingly. In other words, light to be shifted to the upper waveguide 1 which causes a change in refractive index is not used. The change in refractive index can be designed to be large even if the absorption loss is sacrificed. Light shifted to the upper waveguide 1 is susceptible to a large absorption loss and almost does not emerge. Rather, since light shifted to the upper waveguide 1 is not used, a large absorption loss is set to allow almost no light to emerge. When light emerges from the upper waveguide 1 depending on the set wavelength of the light to be modulated, the upper waveguide 1 on the emerging side can be omitted, as shown in FIG. 4A.

As described above, since the light shifted to the upper waveguide 1 receives a large transmission loss in this embodiment, efficiency of coupling this light to the lower waveguide 2 again is small. In this sense, since return of unnecessary light to the lower waveguide 2 need not be taken into consideration, the element length, i.e., the coupling length of the optical modulator can be a perfect coupling length or more. The precision of the perfect coupling length is not strict, and reproducibility of element fabrication can be improved.

The optical modulator of the first embodiment can be manufactured as follows.

A 0.5-μm thick n-GaAs buffer layer 15, a 1.5-μm thick n-$Al_{0.5}Ga_{0.5}As$ lower cladding layer 8, a 0.1-μm thick n-$Al_{0.3}Ga_{0.7}As$ lower waveguide layer 2, and a 0.8-μm thick n-$Al_{0.5}Ga_{0.5}As$ intermediate cladding layer 7 were sequentially stacked on an n+-GaAs substrate 10 by molecular beam epitaxy (MBE) or metal organic chemical vapor deposition (MO-CVD). A plurality of well layers consisting of i-GaAs (thickness: 60 Å) and a plurality of barrier layers consisting of i-$Al_{0.3}Ga_{0.7}As$ (thickness: 100 Å) were alternately stacked on the layer 7 so that a total film thickness became 0.35 μm, thereby forming an upper waveguide 1 of a multiple quantum well structure (MQW). A corrugation having a depth of 0.08 μm was formed by etching on the upper surface of the upper waveguide 1 by a photolithographic method so that the direction of the groove became a forward mesa direction of the substrate 10, thereby forming a grating 3 having a period of 6.9 μm. A 1.5-μm thick p-$Al_{0.5}Ga_{0.5}As$ upper cladding layer 5 and a 0.5-μm thick p+-GaAs contact layer 6 were formed on the grating 3 by the MO-CVD method.

A stripe mask was formed by a photoresist in a direction perpendicular to the grating 3, i.e., the reverse mesa direction of the substrate 10, and etching was performed until the GaAs substrate 10 appeared. After the photoresist mask was removed, as shown in FIG. 4B, a p-$Al_{0.5}Ga_{0.5}As$ layer 41, an i-$Al_{0.5}Ga_{0.5}As$ layer 42, and an n-$Al_{0.5}Ga_{0.5}As$ layer 43 were regrown to the level of the contact layer 6. An $SiO_2$ film 44 was formed on the entire surface of the structure except for the stripe region. An electrode 9 was deposited. The lower surface of the substrate 10 was lapped, and a lower electrode 11 was deposited and subjected to alloying.

A pin optical modulator including the waveguides 1 and 2 is formed, as shown in FIG. 4B. The element length of the optical modulator is 350 μm. The peak wavelength of the absorption end of the upper waveguide 1 consisting of an i-MQW is represented by an energy gap between electrons and heavy holes and is given as 1.50 eV, i.e., 0.824 μm in wavelength. A large absorption index can be obtained for the wavelength of the light to be modulated (in this case, the light having a wavelength of 0.83 μm is radiated on this device and output light is observed). At the same time, a change in refractive index is large. To the contrary, in the lower waveguide 2 consisting of n-$Al_{0.3}Ga_{0.7}As$, its absorption end is located on the sufficiently shorter wavelength side than the wavelength of 0.83 μm of the light to be modulated. Therefore, the optical absorption index is small.

In the above embodiment, a relationship between the applied voltage and the transmittance is obtained, as shown in FIG. 6. When a 2-GHz input NRZ signal is applied and the intensity of the output CW light (continuous light) is observed, a waveform having good tracking characteristics can be obtained.

Figure 7:
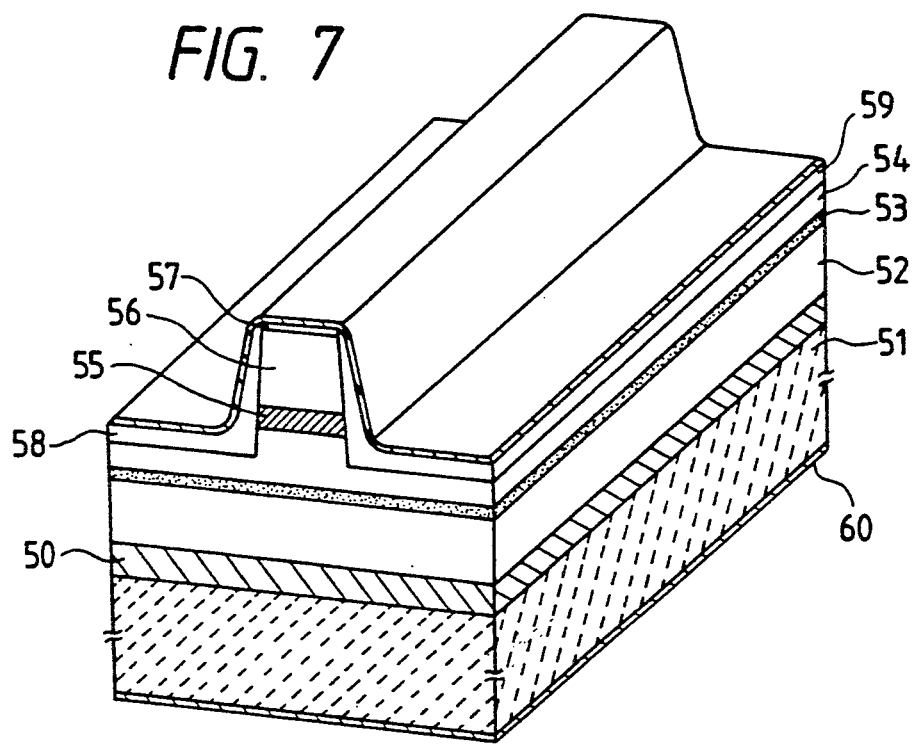
FIG. 7 is a schematic perspective view of an optical modulator according to the second embodiment of the present invention.

FIG. 7 shows an optical modulator according to the second embodiment of the present invention.

As in the first embodiment, a 0.5-μm n-GaAs buffer layer 50, a 1.5-μm thick n-$Al_{0.5}Ga_{0.5}As$ lower cladding layer 52, a 0.08-μm thick n-$Al_{0.3}Ga_{0.7}As$ lower waveguide 53, a 0.9-μm thick n-$Al_{0.5}Ga_{0.5}As$ intermediate cladding layer 54, and a 0.3-μm thick i-$Al_{0.8}Ga_{0.2}As$ upper waveguide 55 were sequentially grown on an n+-GaAs substrate 51. After a grating (not shown) having a period of 7.4 μm was formed on the upper waveguide 55, the upper waveguide 55 was partially etched. Subsequently, a 1.5-μm thick p-$Al_{0.5}Ga_{0.5}As$ upper cladding layer 56 and a 0.5-μm thick p+-GaAs contact layer 57 were regrown.

A 2-μm wide stripe resist mask was formed in a direction perpendicular to the direction of the groove of the grating and was etched to a position 0.2 μm above the lower waveguide 53 by RIE (Reactive Ion Etching). After the resist film was removed, an $Si_3N_4$ film 58 was formed by P-CVD (Plasma Chemical Vapor Deposition). The $Si_3N_4$ film was etched from an upper portion of the stripe by the photolithographic method to expose the p+-GaAs contact layer 57. Thereafter, an electrode 59 was deposited on the upper surface. The lower surface of the substrate 51 was lapped, and an electrode 60 was formed, After alloying was performed, an optical modulator having an element length of 400 μm, as shown in FIG. 7, was formed.

In the second embodiment, the side surfaces of the upper waveguide 55 are in contact with the $Si_3N_4$ film 58. Since a difference between the refractive index of 3.4 to 3.6 of the GaAs/AlGaAs and the refractive index of 1.9 to 2.0 of $Si_3N_4$ is large, a propagation loss caused by interface scattering of the light guided along the upper waveguide 55 is large. The light coupled to the upper waveguide 55 and not to be used has a large loss, resulting in convenience.

In the operation of the second embodiment as in the first embodiment, the light to be modulated and incident on the lower waveguide 53 is coupled to the upper waveguide 55 in accordance with the magnitude of an applied voltage, and the amount of light output from the lower waveguide 53 can be controlled.

At this time, the change in refractive index is based on the absorption end (bulk layer) of the i-$Al_{0.1}Ga_{0.9}As$ upper waveguide 55 and the Franz-Keldysh effect for changing the absorption spectrum in accordance with the electric field.

Since the light coupled to the upper waveguide 55 disappears due to absorption and side-surface scattering in the waveguide, the input/output operation of the light can be performed in only the lower waveguide 53.

The insertion loss of the optical modulator of the second embodiment is mostly caused by the input/output coupling loss of light, and the propagation loss is very small. More specifically, the propagation loss falls within the range of about 0.7 to 0.8 dB with respect to an element length of 500 $\mu$m. In addition, an extinction loss is as high as 30 dB or more. Furthermore, if a high-speed operation of a drive voltage source can be achieved, a response speed of several GHz to several tens of GHz can be obtained.

The principle of operation in the second embodiment is substantially the same as that in the first embodiment.

In each of the first and second embodiments, the optical modulator utilizes a change in refractive index caused by the QCSE, i.e., the electric field effect upon application of a reverse voltage, and the Franz-Keldysh effect. However, the optical modulator may utilize a change in refractive index caused by a change in carrier amount such as a plasma or band filling effect based on carrier injection upon application of a forward voltage.

According to the principle of the present invention, a sufficiently large degree of modulation can be obtained by a small change in refractive index by a change in $\lambda$ of $\beta_0(\lambda)$ and $\beta_1(\lambda)$ of equation (1), so that generation of heat concomitantly caused by carrier injection can be suppressed.

Figure 8:
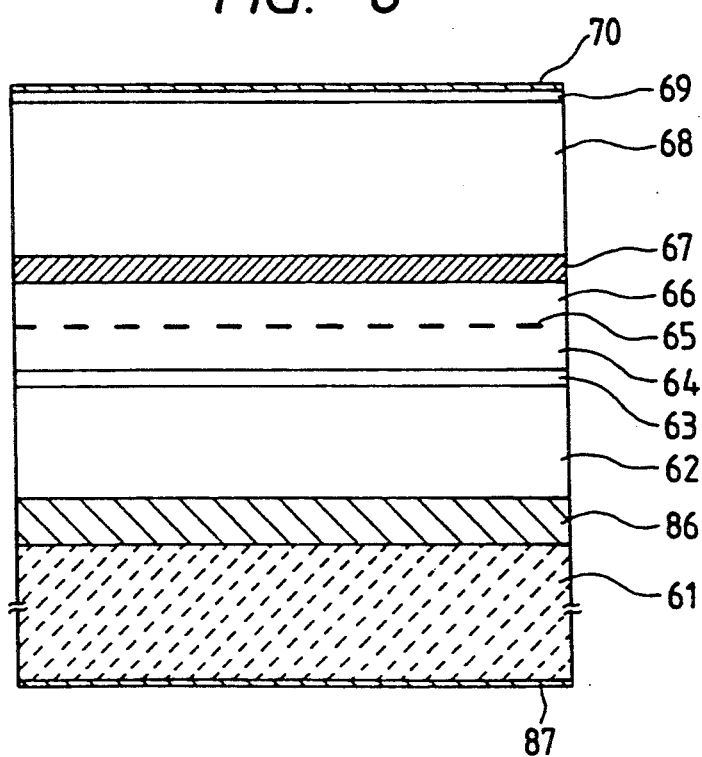
FIG. 8 is a side sectional view of an optical modulator according to the third embodiment of the present invention.

FIG. 8 shows an optical modulator according to the third embodiment. In the third embodiment, unlike in the first and second embodiments wherein the grating is formed in the upper waveguide, a grating is formed between upper and lower waveguides. The optical modulator of this embodiment is manufactured as follows.

A 0.5-$\mu$m thick GaAs buffer layer 86 (n=$2 \times 10^{18}$ cm$^{-3}$), a 1.5-$\mu$m thick $Al_{0.5}Ga_{0.5}As$ cladding layer 62 (n=$1 \times 10^{17}$ cm$^{-3}$), a 0.1-$\mu$m thick $Al_{0.3}Ga_{0.7}As$ lower waveguide layer 63 (n=$1 \times 10^{17}$ cm$^{-3}$), a 0.4-$\mu$m thick $Al_{0.5}Ga_{0.5}As$ intermediate cladding layer 64 (n=$1 \times 10^{17}$ cm$^{-3}$), and a 0.1-$\mu$m thick MQW layer 65 (n=$1 \times 10^{17}$ cm$^{-3}$) obtained by alternately stacking a plurality of GaAs (thickness: 50 Å) well layers and a plurality of $Al_{0.5}Ga_{0.5}As$ barrier layers (thickness: 100 Å) were grown on a GaAs substrate 61 by MBE.

The MQW layer 65 was etched into a grating by the photolithographic method. A 0.4-$\mu$m thick $Al_{0.5}Ga_{0.5}As$ intermediate cladding layer 66 (p=$1 \times 10^{17}$ cm$^{-3}$) and a 0.3-$\mu$m thick $Al_{0.1}Ga_{0.9}As$ upper waveguide layer (nondoped) 67, a 1.5-$\mu$m thick $Al_{0.5}Ga_{0.5}As$ cladding layer 68 (p=$1 \times 10^{17}$ cm$^{-3}$), and a 0.5-$\mu$m thick GaAs contact layer 69 (p=$1 \times 10^{18}$ cm$^{-3}$) were regrown by MO-CVD.

Waveguides and electrodes 70 and 87 were formed following the same procedures as in the second embodiment, thereby forming an optical modulator.

In this embodiment, the upper waveguide (i-type layer) 67 whose refractive index and absorption index are changed upon application of an electric field is separated from the grating 65 for coupling the 0th-order mode to the 1st-order mode. For this reason, even if the distribution of the 1st-order mode propagating through the lower waveguide 63 does not extend to the upper waveguide 67, coupling with the 0th-order mode (i.e., the mode propagating mainly along the upper waveguide 67) occurs in the grating 65. Therefore, a degree of absorption of the 1st-order mode propagating through the lower waveguide 63 is designed to be lower than those of the previous embodiments.

Modulation characteristics of output light with respect to input light (propagating mainly through the lower waveguide 67) were almost the same as those of the previous embodiments.

The grating formation position in the above embodiment is not limited to a specific position, but can be a position where both modes mainly propagating respectively through the waveguides are coupled to each other. For example, a grating may be formed in the lower waveguide to obtain the same effect as described above. The waveguide through which light used is output must be a waveguide different from an i-type layer waveguide whose refractive index and absorption index are changed upon application of an electric field.

Figure 9A:
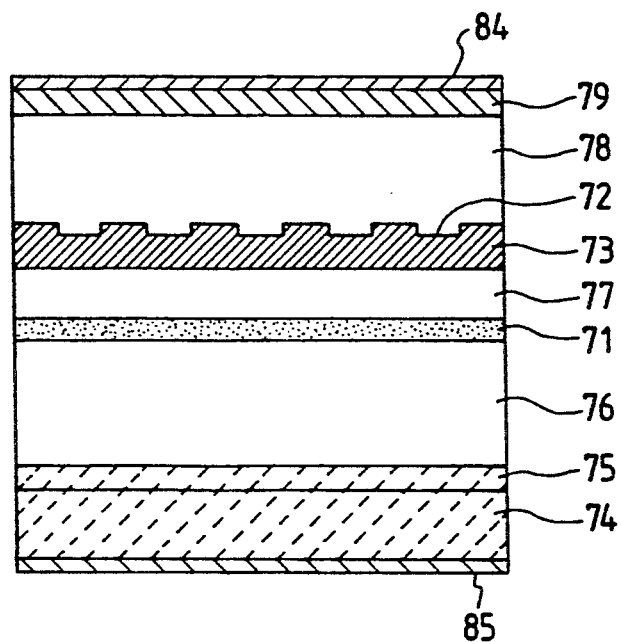
FIGS. 9A and 9B are a side sectional view and a front sectional view, respectively, showing an arrangement of a variable wavelength filter.
Figure 9B:
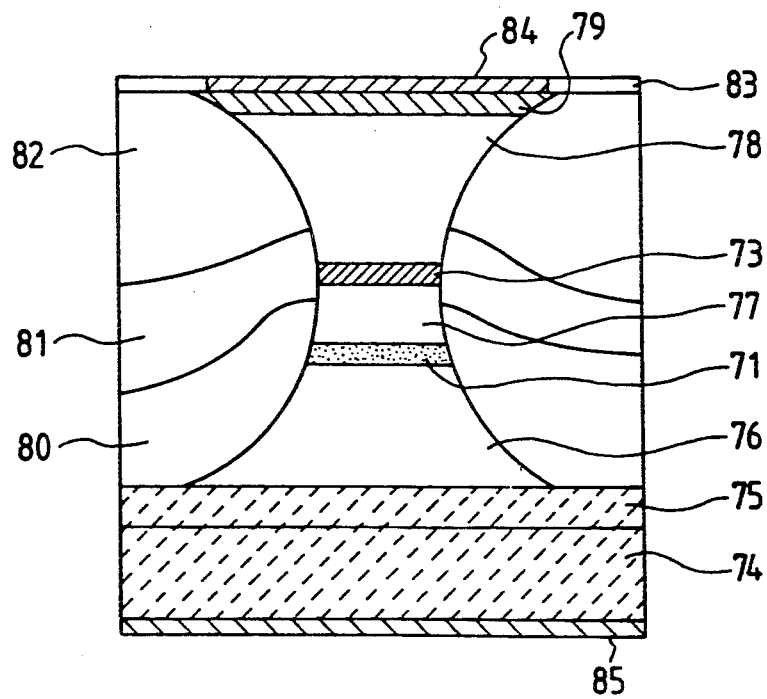
Figure 10A:
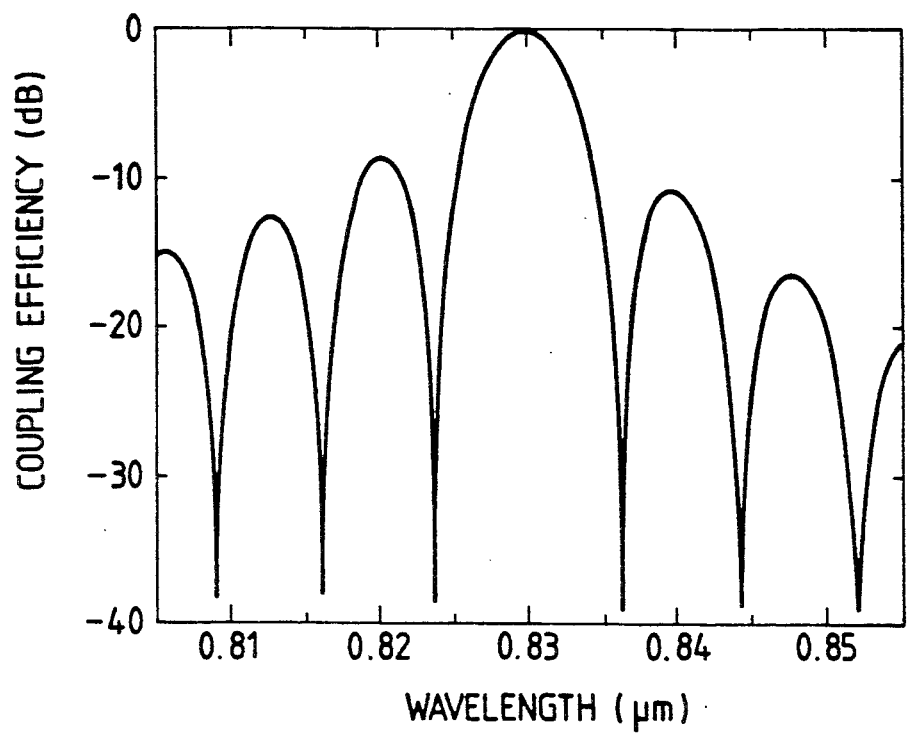
FIGS. 10A and 10B are respectively graphs showing transmission spectra of upper and lower waveguides of the variable wavelength filter shown in FIG. 9A.
Figure 10B:
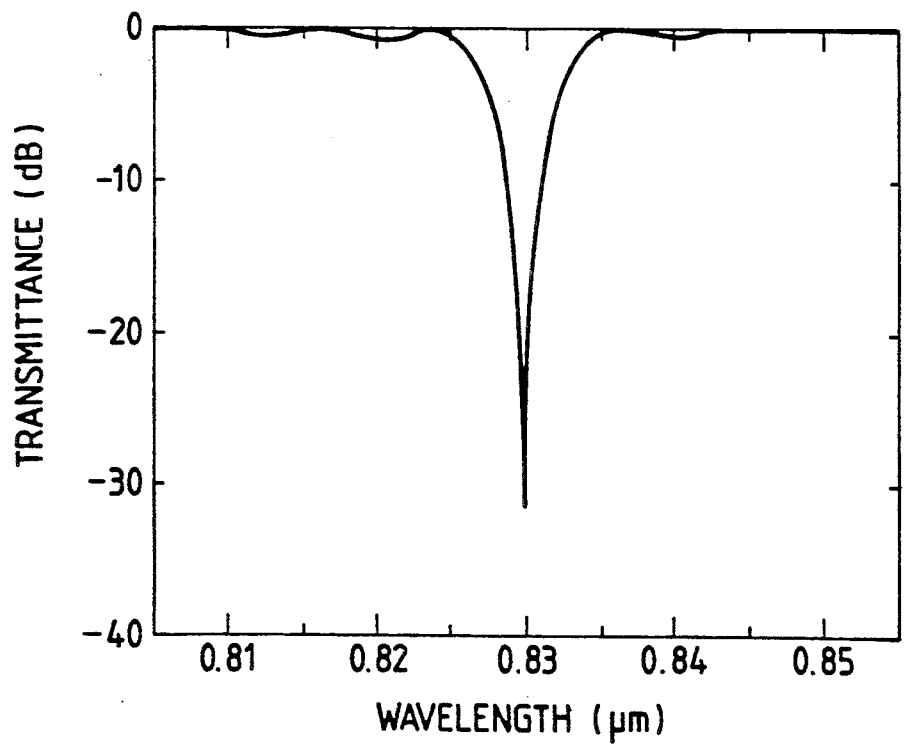

FIGS. 9A and 9B are a side sectional view and a front sectional view, respectively, showing an arrangement of a variable wavelength filter. The principle of operation of this variable wavelength filter is almost the same as that described with the optimal modulators of the previous embodiments. Of all light components coupled to a lower waveguide 71, coupling with an upper waveguide 73 occurs at a wavelength for coupling the waveguides by a grating 72, so that a light shift occurs. A band-pass filter characteristic indicated in FIG. 10A is obtained by the upper waveguide 73. A notch filter characteristic shown in FIG. 10B is obtained by the lower waveguide 71.

This embodiment exemplifies a variable wavelength filter for shifting into the upper waveguide 73 a signal having an arbitrary wavelength, selected from multiplexed optical signals having a plurality of wavelengths and outputting the signal having the arbitrary wavelength. A wavelength filter utilizing an asymmetrical directional coupler and a grating has filter characteristics having a narrower band width than that of a wavelength filter using mode scattering of waveguides constituting a simple directional coupler because mode conversion is performed using a grating.

This filter was manufactured as follows. An n-GaAs buffer layer 75, an $Al_{0.5}Ga_{0.5}As$ cladding layer 76, an MQW i-type lower waveguide 71, a p-$Al_{0.5}Ga_{0.5}As$ cladding layer 77, and an MQW p-type upper waveguide 73 were grown on an n$^+$-GaAs substrate 74 by MBE. Subsequently, a grating was formed by resist patterning, and a corrugation grating 72 was formed in the upper waveguide 73 by RIE.

After the resist mask was removed, a p-$Al_{0.5}Ga_{0.5}As$ cladding layer 78 and a p$^+$-GaAs capping layer 79 were grown by LPE (Liquid-Phase Epitaxy) or MO-CVD.

A stripe pattern was formed by a resist in a direction perpendicular to the grating 72. The wafer was etched into a stripe shape up to the buffer layer 75 by a sulfuric acid etchant. As shown in FIG. 9B, a p-Al$_{0.5}$Ga$_{0.5}$As layer 80, a φ-Al$_{0.5}$Ga$_{0.5}$As layer 81, and an n-Al$_{0.5}$Ga$_{0.5}$As layer 82 were grown by LPE to bury the side surfaces of the stripe portion.

The resultant structure except for the stripe portion was covered with an SiO$_2$ film 83, and thereafter an AuCr/Au electrode 84 was deposited. After the lower surface of the wafer was polished, an AuGe/Au electrode 85 was deposited, and alloying was performed.

When a reverse voltage is applied to the filter manufactured as described above, an electric field is applied to the lower waveguide 71 consisting of φ-MQW, so that the refractive index is changed by QCSE.

Figure 11:
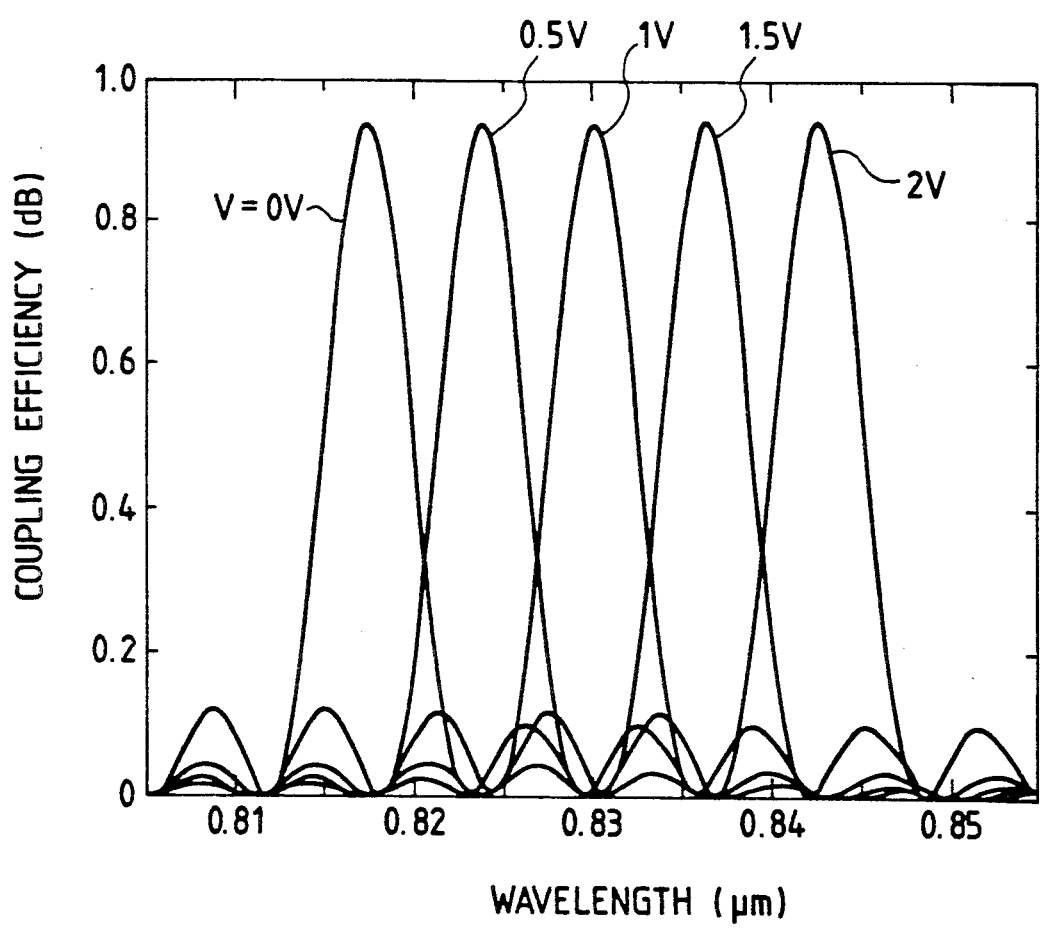
FIG. 11 is a graph showing coupling efficiency from the lower waveguide to the upper waveguide in the variable wavelength filter shown in FIG. 9A.

FIG. 11 is a graph showing coupling efficiency from the lower waveguide 71 to the upper waveguide 73 obtained when voltages of 0.5 V, 1.0 V, 1.5 V, and 2 V are applied to the filter. It is apparent that the band-pass filter transmission band is shifted to a longer wavelength range with changes in applied voltages. A channel having one wavelength can be filtered from the multiplexed channels. Light which propagates through the lower waveguide 71 and cannot be absorbed is not used and must be eliminated by absorption or the like.

In the optical filter, the waveguide may be used as a bulk layer to cause the Franz-Keldysh effect upon application of a reverse voltage, thereby causing a shift of the transmission band in the filter characteristics. In this case, an element length, a grating period, and a grating depth must be reset to appropriate values.

A forward voltage may be applied to the waveguide consisting of an i-type layer to inject carriers, thereby changing the refractive index by the plasma effect. In this case, a gain may be obtained because carrier injection is performed. A coupling loss of the input signal with the waveguide and a propagation loss within the waveguide can be compensated.

FIG. 12 is a block diagram showing an arrangement of an optical communication system using an optimal modulator according to the present invention. The optical communication system comprises optical transmitters/receivers 25$_1$, 25$_2$, and 25$_3$ connected to an optical transmission line 23 comprising optical fibers or the like through optical nodes 24$_1$, 24$_2$, and 24$_3$. The optical transmitters/receivers 25$_1$, 25$_2$, and 25$_3$ are respectively connected to terminal equipments 26$_1$, 26$_2$, and 26$_3$ and perform communication with each other in accordance with commands from these terminal equipments.

The optical transmitter/receiver 25$_1$ includes a controller 29, an optical receiver 30, and an optical transmitter 31. The optical receiver 30 comprises a photodetector 32 for detecting an optical signal from another optical transmitter/receiver, and a demodulator 33 for demodulating a signal from an output from the photodetector 32 and sending a modulated signal to the controller 29. The optical transmitter 31 comprises a light source 28 such as a semiconductor laser, and an optical modulator 27 for modulating light emitted from the light source 28 in accordance with a communication signal S and transmitting the modulated signal to another optical transmitter/receiver. The optical transmitters/receivers 25$_2$ and 25$_3$ have the same arrangement as that of the optical transmitter/receiver 25$_1$.

The optical modulator 27 comprises one of the optical modulators shown in FIGS. 4A, 7, and 8. The optical modulator 27 receives an electric field modulated in accordance with the communication signal S sent from the controller 29, as shown in FIG. 4A and modulates light incident from the light source 28.

The present invention is not limited to the particular embodiments described above. Other various applications may be made. In each embodiment described above, each optical modulator is made of a GaAs-based semiconductor material. However, for example, another semiconductor material such as InP/InGaAsP may be used to arrange an optical modulator. All changes and modifications are incorporated in the present invention without departing from the scope of the appended claims.

What is claimed is:

1. An optical modulator comprising:
   a substrate;
   a first waveguide layer formed on said substrate, said first waveguide layer being arranged to guide external input light and output modulated light;
   a second waveguide layer stacked together with said first waveguide layer in a direction of a thickness thereof on said substrate, said second waveguide layer having a waveguide mode different from that of said first waveguide layer;
   a diffraction grating formed in a region where the waveguide modes of said first and second waveguide layers overlap each other, said diffraction grating coupling to said second waveguide layer light having a wavelength range selected from those of light components propagating through said first waveguide layer; and
   an electrode for applying a modulated electrical signal,
   wherein when the electrical signal is applied through said electrode, the wavelength of the light coupled by said diffraction grating is changed, and light output from said first waveguide layer is modulated in accordance with the electrical signal.

2. A modulator according to claim 1, wherein said second waveguide layer has a multiple quantum well structure.

3. A modulator according to claim 1, wherein said diffraction grating comprises a corrugation formed on one surface of said second waveguide layer.

4. A modulator according to claim 1, further comprising an intermediate cladding layer formed between said first and second waveguide layers, and first and second cladding layers sandwiching said intermediate cladding layer, and said first and second waveguide layers.

5. A modulator according to claim 4, wherein said substrate, said first cladding layer, said first waveguide layer, and said intermediate cladding layer essentially consists of a semiconductor of the first conductivity type, said second waveguide layer essentially consists of an intrinsic semiconductor, and said second cladding layer essentially consists of a semiconductor of the second conductivity type.

6. A modulator according to claim 4, wherein said diffraction grating comprises a semiconductor layer formed in part of said intermediate cladding layer and etched in a shape of a diffraction grating.

7. A modulator according to claim 1, satisfying the following condition:

$$\beta_0(\lambda) - \beta_1(\lambda) = 2\pi/\Lambda$$

where λ is a wavelength of at least a component of the input light, $\beta_0(\lambda)$ is a propagation constant of said first waveguide layer with respect to the light having the wavelength λ, $\beta_1(\lambda)$ is a propagation constant of said second waveguide layer with respect to the light having the wavelength λ, and Λ is a period of said diffraction grating.

8. An optical communication network comprising an optical transmitter including a light source and said optical modulator recited in claim 1 for modulating light emitted from said light source in accordance with a communication signal, an optical receiver, and an optical transmission line for connecting said optical transmitter and said optical receiver.

9. An optical communication network comprising a plurality of optical transmitters/receivers each including an optical transmitter including a light source and said optical modulator recited in claim 1 for modulating light emitted from said light source in accordance with a communication signal, and an optical receiver, and an optical transmission line for connecting said optical transmitters/receivers to each other.

10. A method of modulating light using an optical modulator comprising a substrate, a first waveguide layer formed on said substrate, a second waveguide layer stacked together with said first waveguide layer in a direction of a thickness thereof on said substrate, said second waveguide layer having a waveguide mode different from that of said first waveguide layer, a diffraction grating formed in a region where the waveguide modes of said first and second waveguide layers overlap each other, and an electrode, comprising the steps of:

inputting light into said first waveguide layer;
causing the input light to propagate through said first waveguide layer;
causing said diffraction grating to couple to said second waveguide layer light having a wavelength range selected from those of light components propagating through said first waveguide layer;
applying a modulated electrical signal through said electrode to change the wavelength of the light coupled by said diffraction grating, so that the light propagating through said first waveguide layer is modulated by the change in wavelength; and
outputting the modulated light from said first waveguide layer.

11. A method according to claim 10, satisfying the following condition:

$$\beta_0(\lambda)-\beta_1(\lambda)=2\pi/\Lambda$$

where λ is a wavelength of at least a component of the input light, $\beta_0(\lambda)$ is a propagation constant of said first waveguide layer with respect to the light having the wavelength λ, $\beta_1(\lambda)$ is a propagation constant of said second waveguide layer with respect to the light having the wavelength λ, and Λ is a period of said diffraction grating.

12. An optical modulator comprising:
a substrate;
a first cladding layer consisting essentially of a semiconductor of a first conductivity type formed on said substrate;
a first waveguide layer consisting essentially of a semiconductor of the first conductivity type formed on said first cladding layer, said first waveguide layer being arranged to guide external input light and output modulated light;
a second cladding layer consisting essentially of a semiconductor of the first conductivity type formed on said first waveguide layer;
a second waveguide layer consisting essentially of an intrinsic semiconductor of a quantum well structure formed on said second cladding layer, said second waveguide layer having a waveguide mode different from that of said first waveguide layer;
a third cladding layer consisting essentially of a semiconductor of a second conductivity type formed on said second waveguide layer;
a diffraction grating formed in a region where the waveguide modes of said first and second waveguide layers overlap each other, said diffraction grating coupling to said second waveguide layer light having a wavelength range selected from those of light components propagating through said first waveguide layer; and
an electrode for applying a reverse-biasing modulated electrode filed to said first and second waveguide layers and said first, second, and third cladding layers,
wherein when the electric field is applied through said electrode, the wavelength of the light coupled by said diffraction grating is changed to modulate the light output from said first waveguide layer.

13. A modulator according to claim 12, wherein said second waveguide layer has a multiple quantum well structure.

14. A modulator according to claim 12, wherein said diffraction grating comprises a corrugation formed on one surface of said second waveguide layer.

15. A modulator according to claim 12, wherein said diffraction grating comprises a semiconductor layer formed in part of said second cladding layer and etched in a shape of a diffraction grating.

16. A modulator according to claim 12, satisfying the following condition:

$$\beta_0(\lambda)-\beta_1(\lambda)=2\pi/\Lambda$$

where λ is a wavelength of at least a component of the input light, $\beta_0(\lambda)$ is a propagation constant of said first waveguide layer with respect to the light having the wavelength λ, $\beta_1(\lambda)$ is a propagation constant of said second waveguide layer with respect to the light having the wavelength λ, and Λ is a period of said diffraction grating.

17. An optical communication network comprising an optical transmitter including a light source and said optical modulator recited in claim 12 for modulating light emitted from said light source in accordance with a communication signal, an optical receiver, and an optical transmission line for connecting said optical transmitter and said optical receiver.

18. An optical communication network comprising a plurality of optical transmitters/receivers each including an optical transmitter including a light source and said optical modulator recited in claim 12 for modulating light emitted from said light source in accordance with a communication signal, and an optical receiver, and an optical transmission line for connecting said optical transmitters/receivers to each other.

19. A method of modulating light by using an optical modulator comprising a substrate, a first cladding layer consisting essentially of a semiconductor of a first conductivity type formed on said substrate, a first waveguide layer consisting essentially of a semiconductor of the first conductivity type formed on said first cladding layer, a second cladding layer consisting essentially of a semiconductor of the first conductivity type formed on said first waveguide layer, a second waveguide layer consisting essentially of an intrinsic semiconductor of a quantum well structure formed on said second cladding layer, said second waveguide layer having a waveguide mode different from that of said first waveguide layer, a third cladding layer consisting essentially of a semiconductor of a second conductivity type formed on said second waveguide layer, a diffraction grating formed in a region where the waveguide modes of said first and second waveguide layers overlap each other, and an electrode, comprising the steps of:

inputting light into said first waveguide layer;

causing the input light to propagate through said first waveguide layer;

causing a diffraction grating to couple to said second waveguide layer light having a wavelength range selected from those of light components propagating through said first waveguide layer;

applying a reverse-biasing modulated electrical signal to said first and second waveguide layers and said first, second, and third cladding layers through said electrode to change the wavelength of the light coupled by said diffraction grating, so that the light propagating through said first waveguide layer is modulated by the change in wavelength; and outputting the modulated light from said first waveguide layer.

20. A method according to claim 19, satisfying the following condition:

$$\beta_0(\lambda) - \beta_1(\lambda) = 2\pi/\Lambda$$

where $\lambda$ is a wavelength of at least a component of the input light, $\beta_0(\lambda)$ is a propagation constant of said first waveguide layer with respect to the light having the wavelength $\lambda$, $\beta_1(\lambda)$ is a propagation constant of said second waveguide layer with respect to the light having the wavelength $\lambda$, and $\Lambda$ is a period of said diffraction grating.

* * * * *

UNITED STATES PATENT AND TRADEMARK OFFICE
CERTIFICATE OF CORRECTION

PATENT NO. : 5,131,060
DATED : July 14, 1992
INVENTOR(S) : Sakata

It is certified that error appears in the above-identified patent and that said Letters Patent is hereby corrected as shown below: Title page:

[56] REFERENCES CITED:

Other Publications, under T. Miki, "Informationa" should read --Information--; and under W. Warzanskyj, "Waveguide" should read --Wavelength--; and under R.C. Alferness, "pp. 214-218" should read --pp. 215-218--.

COLUMN 1:

Line 36, "controlled" should read --controlled.---.

COLUMN 2:

Line 34, "with" should read --to--.

COLUMN 8:

Line 59, "formed," should read --formed.---.

COLUMN 14:

Line 10, "second" should read --first--.

Signed and Sealed this

Seventh Day of September, 1993

Attest:

BRUCE LEHMAN

*Attesting Officer*       *Commissioner of Patents and Trademarks*